(12) United States Patent
Lanoye et al.

(10) Patent No.: US 11,566,775 B1
(45) Date of Patent: Jan. 31, 2023

(54) MULTI-COLORED LED LIGHTING MODULE WITH ANGULAR ORIENTATION PARTS

(71) Applicant: Top Victory Investments Limited, Hong Kong (HK)

(72) Inventors: Lieve Lea Andrea Lanoye, Ghent (BE); Nicolas Philippe Henry Babled, Ghent (BE); Chih-Feng Lin, New Taipei (TW); Wen-Sheng Lu, New Taipei (TW); Chia-Chih Lin, New Taipei (TW); Dieter Marcel Freddy Verlinde, Ghent (BE)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 0 days.

(21) Appl. No.: 17/644,768

(22) Filed: Dec. 16, 2021

(30) Foreign Application Priority Data

Oct. 13, 2021 (EP) ..................................... 21202334

(51) Int. Cl.
*F21V 5/04* (2006.01)
*F21Y 113/10* (2016.01)
*F21Y 115/10* (2016.01)

(52) U.S. Cl.
CPC ........... *F21V 5/048* (2013.01); *F21Y 2113/10* (2016.08); *F21Y 2115/10* (2016.08)

(58) Field of Classification Search
CPC ........ F21V 19/001; F21V 5/048; F21V 3/049; F21Y 2107/50; F21Y 2113/10
See application file for complete search history.

(56) References Cited

U.S. PATENT DOCUMENTS

| 1,977,689 | A | * | 10/1934 | Muller | ................... | G08G 1/095 |
| | | | | | | 359/728 |
| 5,101,326 | A | * | 3/1992 | Roney | ..................... | F21S 43/14 |
| | | | | | | 362/800 |
| 6,686,676 | B2 | * | 2/2004 | McNulty | ............... | H01L 33/501 |
| | | | | | | 359/359 |
| 6,777,891 | B2 | * | 8/2004 | Lys | ...................... | H05B 47/155 |
| | | | | | | 315/291 |
| 6,923,548 | B2 | * | 8/2005 | Lim | .................. | G02F 1/133621 |
| | | | | | | 362/601 |
| 7,140,751 | B2 | * | 11/2006 | Lin | .......................... | F21S 4/26 |
| | | | | | | 362/249.02 |
| 7,237,936 | B1 | * | 7/2007 | Gibson | ................... | F21S 45/33 |
| | | | | | | 362/547 |
| 7,631,985 | B1 | * | 12/2009 | Knoble | ............... | F21V 19/0015 |
| | | | | | | 362/240 |
| 2006/0221613 | A1 | * | 10/2006 | Coushaine | ................ | F21K 9/00 |
| | | | | | | 257/E33.073 |

(Continued)

*Primary Examiner* — Ismael Negron
(74) *Attorney, Agent, or Firm* — Hamre, Schumann, Mueller & Larson, P.C.

(57) ABSTRACT

At least two lighting modules are disposed on a printed circuit board (PCB). Each of the lighting modules includes a plurality of light emitting diode (LED) chips disposed in a non-rectangular array. Lenses are provided over the lighting modules. Each lens has a convex outer surface, and a chamber with a planar or concave inner surface facing a corresponding lighting module and disposed to cover the LED set within the chamber. A light projecting device includes a plurality of LED sets and a plurality of lenses. An orientation part couples each lighting module to the PCB at a non-zero angle.

14 Claims, 6 Drawing Sheets

(56) References Cited

U.S. PATENT DOCUMENTS

| | | | |
|---|---|---|---|
| 2007/0091602 A1* | 4/2007 | van Voorst Vader | G03B 15/05 362/11 |
| 2008/0152933 A1* | 6/2008 | Mizuno | C08K 9/04 524/133 |
| 2011/0019401 A1* | 1/2011 | Chen | G02B 27/0955 362/282 |
| 2011/0320024 A1* | 12/2011 | Lin | F21V 5/007 703/2 |

* cited by examiner

MULTI-COLORED LED LIGHTING MODULE WITH ANGULAR ORIENTATION PARTS

CROSS-REFERENCE TO RELATED APPLICATION

This application claims priority of European Patent Application No. 21202334.5, filed on Oct. 13, 2021.

FIELD

The disclosure relates to a lighting module and a light projecting device that includes the lighting module.

BACKGROUND

Conventionally, in the field of display devices such as television backlighting, light-emitting diode (LED) lighting devices may be employed, and arranged in arrays on a rear surface of a television device that is opposite to a display screen of the television device. Referring to FIG. 1, each of the LED lighting devices typically includes a loader 11, an LED chip 12 and a lens 13. The loader 11 is a pentahedron having a triangular cross-section, and has a top surface 14 and a bottom surface 15 that define a non-zero angle θ therebetween. The loader 11 is mounted on a PCB 10 with the bottom surface 15 in contact with the PCB 10. The LED chip 12 is mounted on the top surface 14 of the loader 11, such that a light-emitting surface (LES) 16 of the LED chip 12 and the PCB 110 also have the non-zero angle θ therebetween. The lens 13 covers the LED chip 11. By controlling the LED lighting devices, light may be projected on a wall at the back of the television device while the display screen is activated. This may be referred to as a backlighting effect.

SUMMARY

Therefore, an object of the disclosure is to provide a lighting module that can be assembled more efficiently, and with a smaller overall size.

According to one embodiment of the disclosure, the lighting module includes a non-rectangular light-emitting diode (LED) set to be disposed on a printed circuit board (PCB), and a lens that defines a chamber and that is disposed to cover said LED set within the chamber.

Another object of the disclosure is to provide a light projecting device that includes the components of the above-mentioned lighting module.

According to one embodiment of the disclosure, the light projecting device includes: a printed circuit board and a plurality of lighting modules disposed on the PCB.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
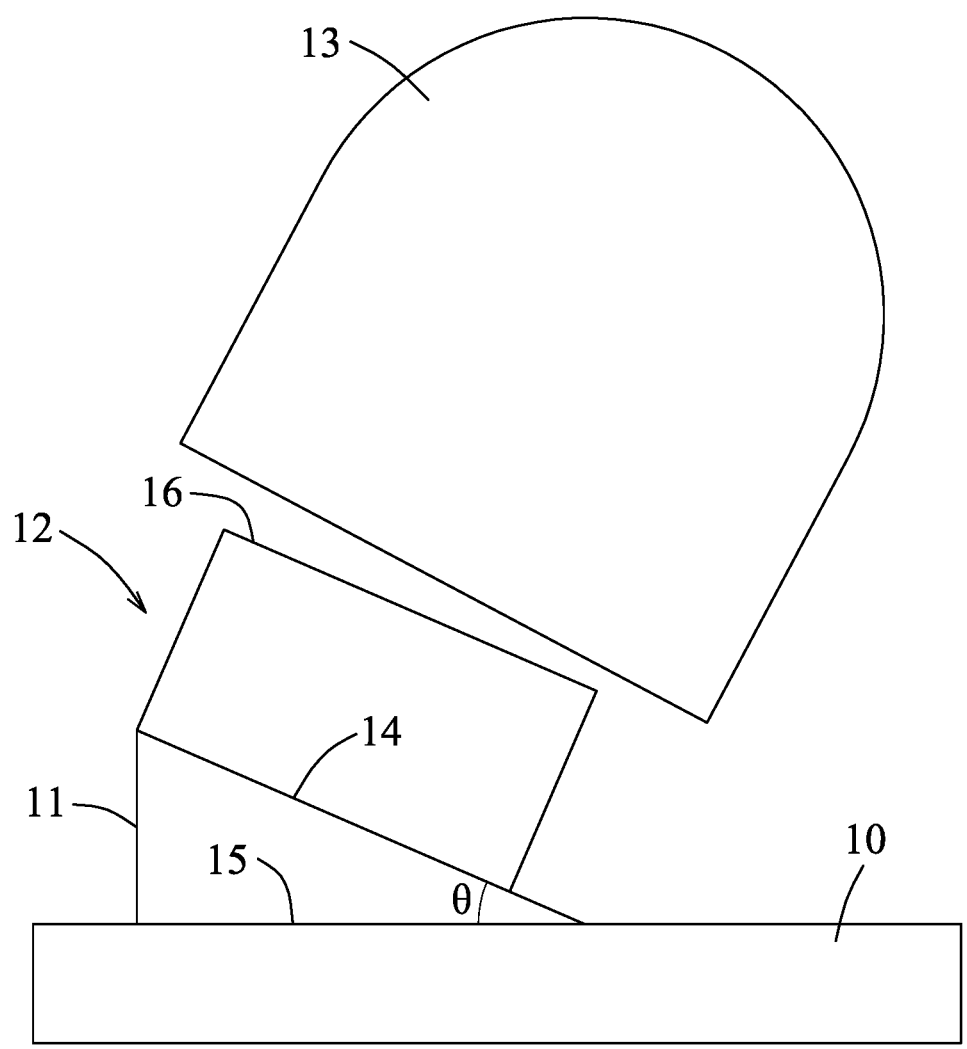
FIG. 1 is a cross-sectional view illustrating a conventional lighting module.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
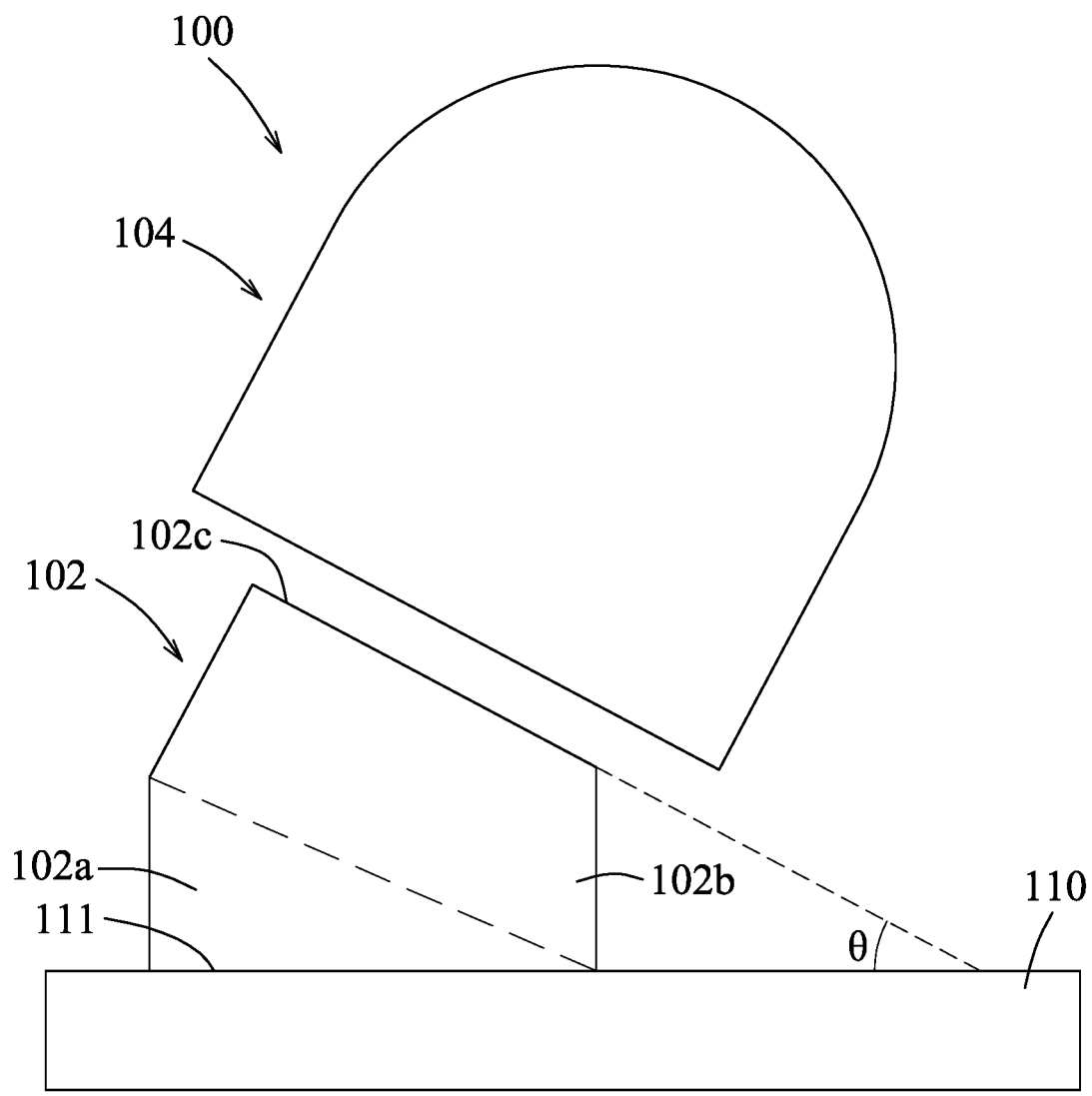
FIG. 2 is a cross-sectional view illustrating a lighting module according to one embodiment of the disclosure.

FIG. 2 is a cross-sectional view illustrating a lighting module 100 according to one embodiment of the disclosure. The lighting module 100 is mounted on a printed circuit board (PCB) 110, and includes a light-emitting diode (LED) set 102 and a lens 104.

The LED set 102 includes at least one red LED chip, at least one green LED chip, and at least one blue LED chip, which may be referred to as a set of red, green, blue (RGB) LED chips. In various embodiments, the LED set 102 may include additional LED chips or other kinds of LED chips (e.g., a white LED chip).

The LED set 102 is mounted on a mounting surface 111 of the PCB 110, and is configured to have a non-rectangular shape.

Specifically, in different applications, the LED set 102 is to be disposed such that a light-emitting surface (LES) 102c of the LED set 102 is not parallel to the mounting surface 111 of the PCB 110. That is to say, the LES 102c and the PCB 110 define a first non-zero angle θ therebetween.

In this embodiment, the LED set 102 is constructed to have an orientation part 102a that is in contact with the PCB 110, and a light-emitting part 102b disposed on the orientation part 102a, such that the LES 102c of the light-emitting part 102b and the mounting surface 111 of the PCB 110 define the first non-zero angle θ. Based on the applications for the lighting module 100, the dimensions of the LED set 102, especially the orientation part 102a, may be designed to have a desired angle that is equal to/(that is associated with) the first non-zero angle θ.

Figure 3:
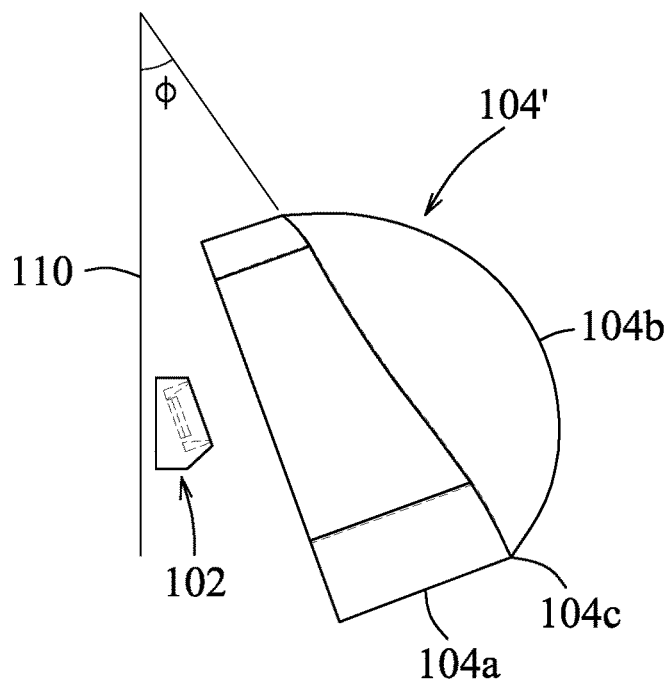
FIG. 3 is a side view of the lighting module according to one embodiment of the disclosure.

FIG. 3 is a side view of the lighting module 100 according to one embodiment of the disclosure.

The lens 104' may be formed using materials permeable to light (such as glass, epoxy resin, etc.), and defines a chamber 104e. The lens 104' is disposed to cover the LED set 102 within the chamber 104e.

As shown in FIG. 3, the lens 104' is designed to have a first part 104a and a second part 104b. The first part 104a is in contact with the PCB 110, and is disposed to surround the LED set 102.

Figure 4:
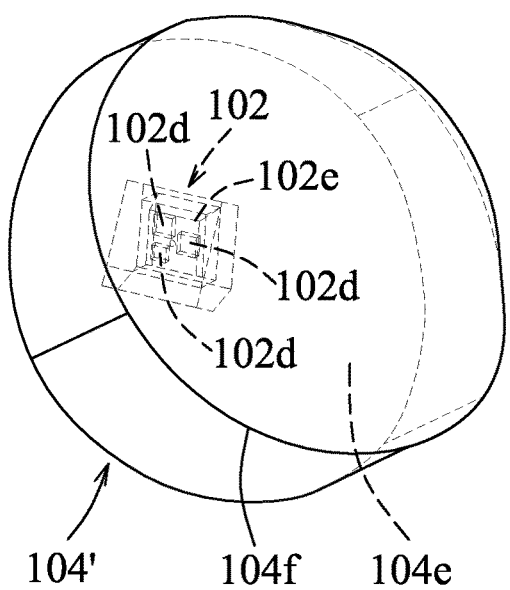
FIG. 4 is a perspective view of the lighting module according to one embodiment of the disclosure.
Figure 5:
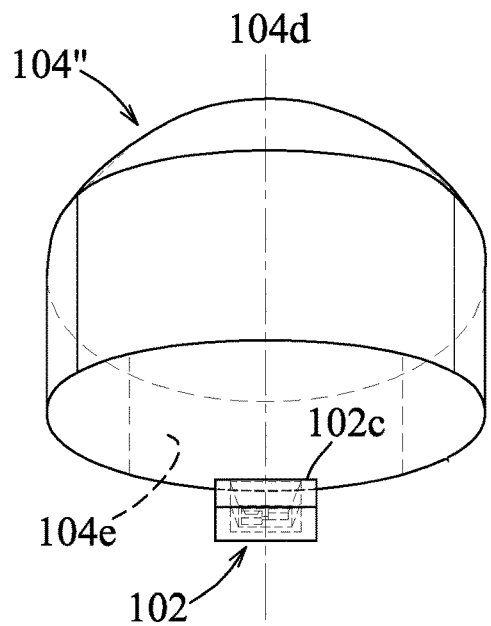
FIG. 5 is another perspective view of the lighting module viewed from another angle according to one embodiment of the disclosure.

The first part 104a has a trapezoid shape when viewed from the side and is defined by an edge 104c, such that the edge 104c and the PCB 110 define a second non-zero angle ψ. The second part 104b is disposed on the edge 104c of the first part 104a so as to cover the LED set 102. In different embodiments, the second part 104b has one of a round shape or an oval shape (that is, the second part 104b has a round-shaped or oval-shaped cross-section when viewed from the top). FIG. 4 is a perspective view of the lighting module 100 according to one embodiment of the disclosure. FIG. 5 is another perspective view of the lighting module 100 when viewed from another angle according to one embodiment of the disclosure.

Referring to FIG. 4, in this embodiment, the LED set 102 may be manufactured by arranging a number of LED chips 102d (e.g., a red LED chip, a green LED chip, and a blue LED chip) on a substrate 102e, and covering the substrate 102e in a package to have a form as described in FIG. 2, but is not limited to such.

Figure 9:
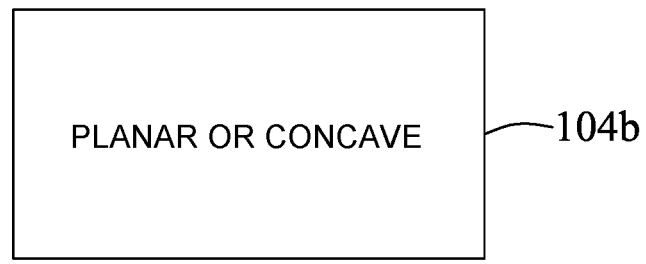
FIG. 9 is a schematic view showing an exemplary inner surface of a second part of a lens.

In use, to accommodate the various applications of the lighting module 100, the second part 104b may have different shapes. In this embodiment, the second part 104b has an inner surface that serves as a light-incident surface (i.e., a surface on which light emitted from the LED set 102 will first strike), and a convex outer surface that serves as a light-leaving surface (i.e., a surface from which the light exits the lens 104). In this embodiment, the inner surface is a concave surface (as shown in FIGS. 4 and 5); however, it may be a planar surface in other embodiments, as shown in, for example, FIG. 9.

After the lens 104' is disposed to cover the LED set 102, the first non-zero angle θ and the second non-zero angle ψ may be equal to or different from each other. In some embodiments, the second part 104b of the lens 104" defines a central axis 104d, and the LED set 102 is disposed such that the central axis 104d passes through a center point of the LES 102c (see for example FIG. 5).

Figure 10:
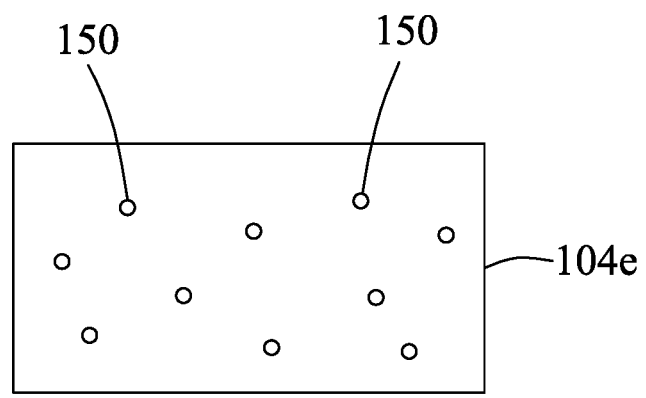
FIG. 10 is a schematic view showing an exemplary chamber of a lens filled with filler particles.

In some embodiments, after the lens 104' is disposed to cover the LED set 102, the chamber 104e of the lens 104' may be filled with filler particles 150 (small particles floating in the chamber 104e) as shown in FIGS. 5 and 10. In different embodiments, the filler particles may include one of $ZrO_2$ and $SiO_2$. The filler particles are disposed in the chamber 104e to enhance a color mixing effect of the lighting module 100.

It is noted that in various applications, a plurality of the lighting modules 100 as described above may be implemented together for providing desired lighting effects, such as a backlighting effect for a television device (i.e., projecting light on a wall at the back of the television device while a display screen of the television device is activated).

Figure 6:
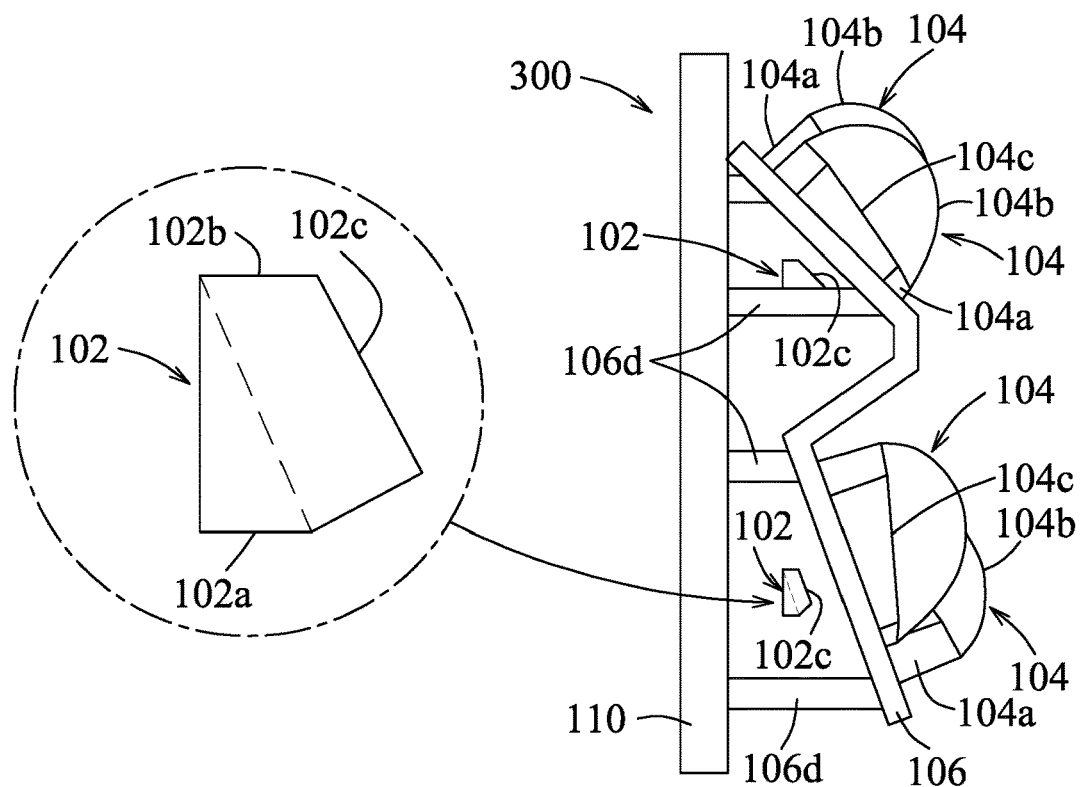
FIG. 6 is a side view of a light projecting device according to one embodiment of the disclosure.
Figure 8:
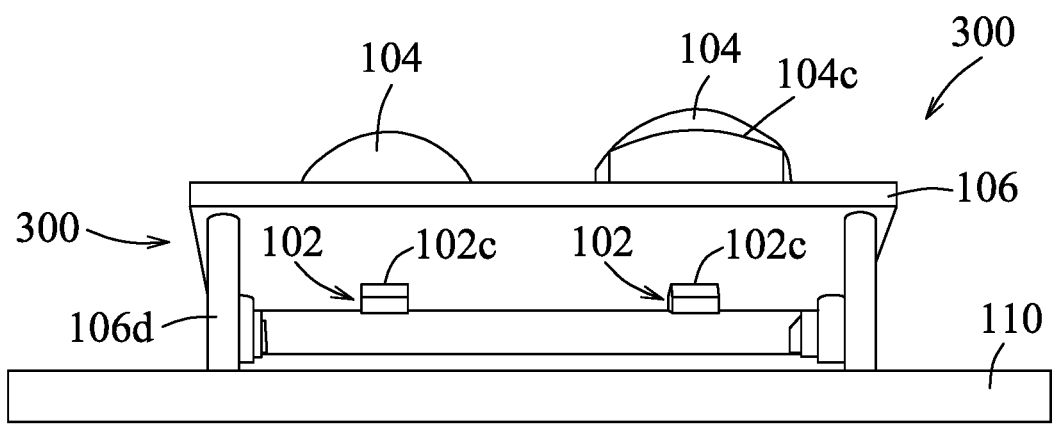
FIG. 8 is a bottom view of the light projecting device according to one embodiment of the disclosure.

FIG. 6 is a side view of a light projecting device 300 according to one embodiment of the disclosure. FIG. 8 is a bottom view of the light projecting device 300 according to one embodiment of the disclosure.

In this embodiment, the light projecting device 300 includes a PCB 110, a plurality of non-rectangular LED sets 102 disposed on the PCB 110, and a plurality of lenses 104 that are disposed on the PCB 110 to cover LED sets 102, respectively.

It is noted that each of the LED sets 102 and the lenses 104 may be configured in the manners as described in the above-mentioned embodiments. That is to say, each of the LED sets 102 has an orientation part 102a that is in contact with the PCB 110, and a light-emitting part 102b disposed on the orientation part 102a. A light-emitting surface 102c of the light-emitting part 102b and the PCB 110 define a non-zero rotated angle.

Each of the lenses 104 has a first part 104a and a second part 104b. The first part 104a is in contact with the PCB 100 and is disposed to surround a corresponding one of the LED sets 102. The first part 104a is defined by an edge 104c that defines an angular position with the PCB 110. The second part 104b is disposed on the edge of the first part 104a so as to cover the corresponding one of the LED sets 102. The second part 104b has one of a round shape and an oval shape.

For each of the lenses 104, the second part 104b has an inner surface that serves as a light-incident surface, and a convex outer surface that serves as a light-leaving surface. The inner surface is one of a planar surface or a concave surface.

The chamber 104e of each of the lenses 104 may be filled with filler particles (small particles floating in the chamber 104e). In different embodiments, the filler particles may include one of $ZrO_2$ and $SiO_2$.

While in this embodiment four LED sets 102 and four lenses 104 are used, in different embodiments, various numbers of LED sets 102 and lenses 104 may be included in the light projecting device 300.

Figure 7:
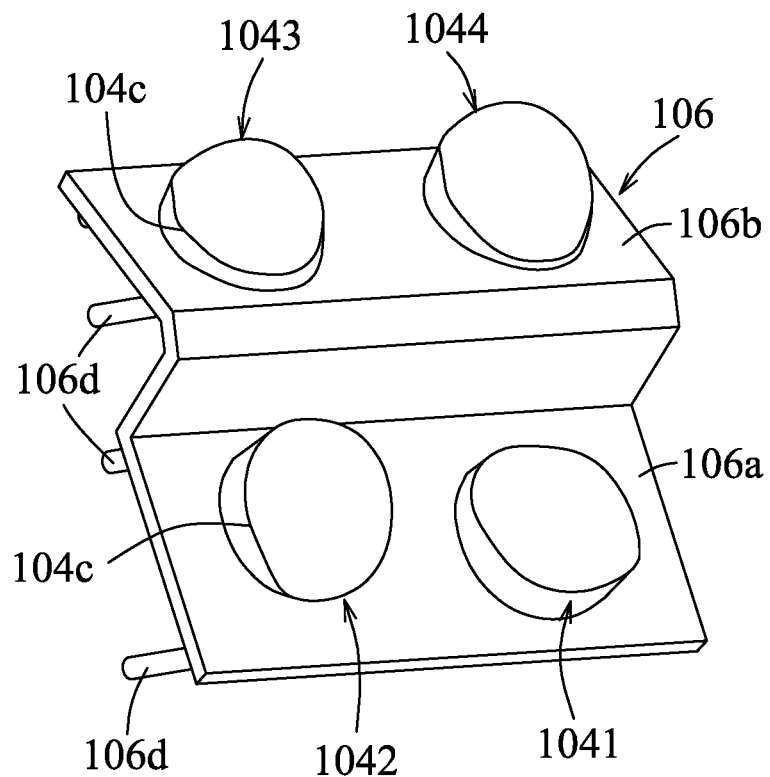
FIG. 7 is a perspective view of the light projecting device according to one embodiment of the disclosure.

It is noted that in this embodiment, the lenses 104 may be formed integrally as one piece. FIG. 7 is a perspective view of a base board 106 according to one embodiment of the disclosure. As shown in FIG. 7, the lenses 104 are formed on the base board 106, and the base board 106 is disposed on the PCB 110. In this embodiment, the base board 106 has a first part 106a and a second part 106b that are not coplanar; that is to say, each of the first part 106a and the second part 106b has a supporting surface which the lenses 104 are formed on, and the supporting surfaces of the first part 106a and the second part 106b extend in different directions. In this embodiment, the base board 106 includes a plurality of supporting legs 106d with different lengths, such that when the supporting legs are disposed on the PCB 110, the first part 106a and the second part 106b may face different directions.

Two of the four lenses 104 (labeled as 1041, 1042) are disposed on the first part 106a of the base board 106, and the other two of the four lenses 104 (labeled as 1043, 1044) are disposed on the second part 106b of the base board 106. It is noted that the relative positions of the four LED sets 102 on the PCB 110 (and in turn, the relative positions of the four lenses 104 on the base board 106) may be arranged in different manners to fit the requirements of various applications, and are not limited to those shown in the drawings.

In this embodiment, the lenses 1041 and 1042 are shaped to have two unique non-zero angles (i.e., two different angles) related to the first part 106a of the base board 106, and the lenses 1043 and 1044 are shaped to have two non-zero angles (i.e., two different angles) related to the second part 106b of the base board 106, but the angular positions among the lenses 104 and the base board 106 are not limited as such.

In use, a plurality of light projecting devices 300 as shown in FIGS. 6 to 8 may be employed on various applications such as on a back surface of a television device that is opposite to a display screen of the television device.

To sum up, the embodiments of the disclosure provides a lighting module and a light projecting device that includes the lighting module. In the embodiments, the LED sets are formed to have an orientation part that is in contact with the PCB and a light-emitting part. Since the orientation part and the light-emitting part are integrated, when the LED set is mounted on the PCB, the LED is "rotated" to have the rotated angle with the PCB, and such an effect may be achieved without having to first mount a loader on the PCB before mounting the LED set on the loader. As a result, the assembly of the lighting module may be done with more efficiency, the resulting size of the lighting module may be reduced (which may be particularly beneficial in the applications on a television device), and the potential for loose contact among the PCB, the loader and the LED set may be eliminated.

Additionally, by forming the lens to have a specific shape as described in the embodiments, the resulting light module and the light projecting device may be controlled to project light patterns to satisfy various specification requirements of different applications.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lighting module comprising:
    a printed circuit board;
    a light-emitting diode (LED) set disposed on the printed circuit board, the LED set including a plurality of LED chips disposed in a non-rectangular array;
    a lens disposed over the LED set, the lens defining a chamber facing the LED set;
    wherein the LED set has an orientation part that is in contact with the printed circuit board and a light-emitting part disposed on the orientation part such that a light-emitting surface of the light-emitting part and the printed circuit board define a first non-zero angle;
    wherein the lens has:
        a first part that is in contact with the printed circuit board and is disposed to surround the LED set, the first part being defined by an edge such that the edge and the printed circuit board define a second non-zero angle, and
        a second part disposed on the edge of the first part over the LED set, the second part having one of a round shape or an oval shape.

2. The lighting module of claim 1, wherein the LED set includes at least one red LED chip, at least one green LED chip, and at least one blue LED chip.

3. The lighting module of claim 1, wherein the LED set is mounted on a mounting surface of the printed circuit board, and is configured to have a non-rectangular shape.

4. The lighting module of claim 1, wherein the second part has an inner surface that serves as a light-incident surface, and a convex outer surface that serves as a light-leaving surface.

5. The lighting module of claim 4, wherein the inner surface is one of a planar surface and a concave surface.

6. The lighting module of claim 1, further comprising filler particles filling the chamber of the lens.

7. The lighting module of claim 6, wherein the filler particles include $ZrO_2$ or $SiO_2$.

8. A light projecting device comprising:
    a plurality of lighting modules of claim 1 disposed on the printed circuit board.

9. The light projecting device of claim 8, further comprising:
    a base board including a first part and a second part that are not coplanar,
    wherein the plurality of lenses in the plurality of lighting modules are formed integrally on the base board, the plurality of lenses including at least first and second lenses disposed on the first part of the base board, and at least third and fourth lenses disposed on the second part of the base board.

10. The light projecting device of claim 8, further comprising filler particles disposed in the chamber of each of the lenses.

11. The light projecting device of claim 8, wherein:
    each of the lenses defines a unique non-zero angle with the base board.

12. The light projecting device of claim 11, wherein: for each of the lenses, the second part has an inner surface that serves as a light-incident surface, and a convex outer surface that serves as a light-leaving surface.

13. The light projecting device of claim 11, wherein the inner surface is one of a planar surface and a concave surface.

14. A light projecting device comprising:
    a printed circuit board,
    a plurality of lighting modules disposed on the printed circuit board, each of the lighting modules including
        a light-emitting diode (LED) set disposed on the printed circuit board, the LED set including a plurality of LED chips disposed in a non-rectangular array, and
        a lens disposed over the LED set, the lens defining a chamber facing the LED set; and
    a base board including a first part and a second part that are not coplanar,
    wherein the plurality of lenses in the plurality of lighting modules are formed integrally on the base board, the plurality of lenses including at least first and second lenses disposed on the first part of the base board, and at least third and fourth lenses disposed on the second part of the base board.

* * * * *